(12) United States Patent  
Corbin

(10) Patent No.: US 7,472,782 B2
(45) Date of Patent: Jan. 6, 2009

(54) ROTARY FEEDER

(76) Inventor: R. Scott Corbin, 2100 Clearwater Way, Elgin, IL (US) 60123

( * ) Notice: Subject to any disclaimer, the term of this patent is extended or adjusted under 35 U.S.C. 154(b) by 443 days.

(21) Appl. No.: 11/405,302

(22) Filed: Apr. 17, 2006

(65) Prior Publication Data

US 2007/0240968 A1  Oct. 18, 2007

(51) Int. Cl.
 *B65G 47/24* (2006.01)
(52) U.S. Cl. .................................... 198/392
(58) Field of Classification Search ........... 198/392, 198/406, 408
 See application file for complete search history.

(56) References Cited

U.S. PATENT DOCUMENTS

| | | | | |
|---|---|---|---|---|
| 3,543,909 | A | * | 12/1970 | Kazuo ...................... 198/392 |
| 3,658,207 | A | | 4/1972 | Schultz |
| 3,702,663 | A | | 11/1972 | Joele |
| 3,882,998 | A | | 5/1975 | Hunter |
| 3,960,293 | A | * | 6/1976 | Sweet et al. ............... 221/258 |
| 4,007,854 | A | * | 2/1977 | Ervine ..................... 221/167 |
| 4,429,808 | A | | 2/1984 | Doty |
| 4,699,261 | A | * | 10/1987 | Nesin ...................... 198/398 |
| 4,830,172 | A | | 5/1989 | Hilton |
| 4,848,559 | A | * | 7/1989 | Hoppman et al. .......... 198/392 |
| 5,145,051 | A | | 9/1992 | Hoppmann |
| 5,299,675 | A | * | 4/1994 | Schumann et al. ......... 198/392 |
| 5,389,041 | A | | 2/1995 | Schmitt |
| 5,906,571 | A | | 5/1999 | Neber |
| 6,578,699 | B2 | * | 6/2003 | Baird et al. ............... 198/392 |

* cited by examiner

*Primary Examiner*—Douglas A Hess
(74) *Attorney, Agent, or Firm*—Miller, Matthias & Hull

(57) ABSTRACT

A rotary feeder for transferring articles includes a support frame, a rotatably driven bowl assembly mounted on the support frame and including a bowl mounted for rotation about a bowl axis, and a rotatably driven shaft mounted on the support frame for rotation about a shaft axis. A coupling is rotatably driven by the shaft and has a first end coupled to the shaft and a second end, the second end being pivotable with respect to the first end to define a tilt axis oriented at an angle with respect to the bowl axis. An adjustable guide assembly is mounted on the support frame and adapted to secure the coupling second end along a selected tilt axis. A disc is coupled to the coupling second end and rotates about the tilt axis, the disc including a lower portion and an upper portion, the upper portion defining an article transfer point.

19 Claims, 5 Drawing Sheets

ROTARY FEEDER

FIELD OF THE DISCLOSURE

The present disclosure generally relates to article handling equipment and, more particularly, to rotary feeders for transferring articles from a reservoir to a support surface positioned adjacent thereto.

BACKGROUND OF THE DISCLOSURE

During various types of processes, such as manufacturing or assembling articles, it is often necessary to orient and/or singulate the articles to facilitate automated feed into associated processing equipment. In particular, rotary feeders are known which use centrifugal force to create a series or stream of singulated articles. Typically, a bulk volume of articles are placed in the rotary feeder, which then acts to singulate and/or orientate the articles as they are supplied to associated equipment or the like, with the articles arranged into a sequential stream where all of the articles are typically arranged in a single orientation. This type of technology is typically employed in automated processes, where relatively higher throughput is required. Conventional rotary feeders are disclosed in U.S. Pat. Nos. 6,578,699; 5,145,051; and 4,429,808.

A typical rotary feeder has two primary components: a bowl assembly and a feed disc assembly. The bowl assembly includes a bowl defining a reservoir for holding a plurality of articles and an out-turned flange onto which each article is to be transferred. The bowl is typically rotatable about a substantially vertical bowl axis. The feed disc assembly includes a feed disc disposed inside the bowl at an inclined angle to define a lower portion positioned near a bottom of the bowl and an upper portion positioned near the out-turned flange. The feed disk is rotated so that it engages individual articles disposed inside the bowl and transports them, via centrifugal force, up the inclined angle to out-turned flange. The bowl assembly may also be rotated to advance articles deposited onto the out-turned flange to a discharge point, where the articles are further processed by other machinery.

While the previously known rotary feeders are generally suitable for creating a series of singulated articles, it is overly difficult or impossible to adjust the disc for use with articles of different geometries or sizes. Some rotary feeders have a feed disc that is fixed at a single incline angle, and therefore is suitable only for certain types of articles or operations. Other rotary feeders are known which allow adjustment of the feed disc incline angle, but allow such adjustment only by moving the entire shaft to which the feed disc is coupled, such as U.S. Pat. Nos. 3,960,293 and 3,702,663. Adjustment of the entire feed disc shaft is not only overly difficult, but also complicates coupling of the shaft to a drive for rotating the shaft.

In addition, conventional rotary feeders are overly difficult to assembly for custom article sizes and to maintain sufficient tolerances between components. In known feeders, the bowl is typically formed with the desired out-turned flange and then is subsequently mounted on a support frame. The flange must be sized not only to properly support the particular articles being processed, but must also cooperate with surrounding structures such as a guide fence and discharge point positioned about a perimeter of the bowl, and therefore close tolerances between these parts must be maintained. With conventional rotary feeders, the bowl is typically a custom fabricated item and therefore can be overly expensive. In addition, formation of the out-turned flange prior to assembly may result in unintended and possibly unacceptable gaps between the bowl and surrounding structures.

SUMMARY OF THE DISCLOSURE

In view of the foregoing, a rotary feeder for transferring articles includes a support frame, a rotatably driven bowl assembly mounted on the support frame and including a bowl mounted for rotation about a bowl axis, and a rotatably driven shaft mounted on the support frame for rotation about a shaft axis. A coupling is rotatably driven by the shaft and has a first end coupled to the shaft and a second end, the second end being pivotable with respect to the first end to define a tilt axis oriented at an angle with respect to the bowl axis. An adjustable guide assembly is mounted on the support frame and adapted to secure the coupling second end along a selected tilt axis. A disc is coupled to the coupling second end and rotates about the tilt axis, the disc including a lower portion and an upper portion, the upper portion defining an article transfer point.

In an alternative embodiment, a rotary feeder includes a support frame, a rotatably driven lower hub mounted on the support frame, and a bowl coupled to the lower hub assembly for rotation about a bowl axis, the bowl including a side wall and a flange. A rotatably driven shaft is mounted on the support frame for rotation about a shaft axis, the shaft axis being substantially coincident with the bowl axis. A coupling is rotatably driven by the shaft, the coupling having a first end coupled to the shaft and a second end, the second end being pivotable with respect to the first end to define a tilt axis oriented at an angle with respect to the bowl axis. A riser is mounted on the support frame, and an adjustable guide assembly is coupled to the riser and adapted to secure the coupling second end at a selected tilt axis. A disc is coupled to the coupling second end and rotates about the tilt axis, the disc including a lower portion and an upper portion, the upper portion defining an article transfer point for transferring articles from the disc to the bowl flange.

In accordance with additional aspects of the present disclosure, a method of assembling a rotary feeder comprises providing a support frame, forming a bowl having a side wall and an out-turned flange, the out-turned flange having a standard width, mounting the bowl on the support frame, and trimming the out-turned flange to a custom width while the bowl is mounted on the support frame.

BRIEF DESCRIPTION OF THE DRAWINGS

For a more complete understanding of the disclosed subject matter, reference should be made to the embodiments illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses, or which render other details difficult to perceive, may have been omitted. It should be understood, of course, that this disclosure is not limited to the particular embodiments illustrated herein.

DETAILED DESCRIPTION

A rotary feeder is disclosed herein having a disc rotatable about a disc axis that is disposed at an angle with respect to an axis of a drive shaft coupled to the feed disc. In addition, the incline angle of the feed disc is adjustable to accommodate different article geometries and sizes, or to perform certain types of transfer procedures. For example, the feed disc may be oriented with its upper portion disposed below the bowl out-turned flange so that the articles flip as they are transferred from the feed disc to the flange. Alternatively, the feed disc may be positioned with its upper portion above the bowl so that the articles are dropped onto the flange. While particular rotary feeder structure and processes are described herein, it will be appreciated that this disclosure is not limited thereto as the disclosed features may be incorporated into any type of rotary feeder that may benefit from the advantages described herein.

An exemplary embodiment of a rotary feeder 20 is illustrated in FIGS. 1-5. This type of article handling equipment is particularly suited for handling bulk volumes of individual articles, wherein it is desired to singulate (i.e., form a single, sequential stream of articles) and/or orient (i.e., arrange each of the articles in the same, single orientation) such as for delivery during automated processing to associated equipment and the like. As an example, plastic closures for containers are typically singulated and oriented (e.g., all top-side up or all top-side down) for delivery to associated bottling equipment.

Figure 1:
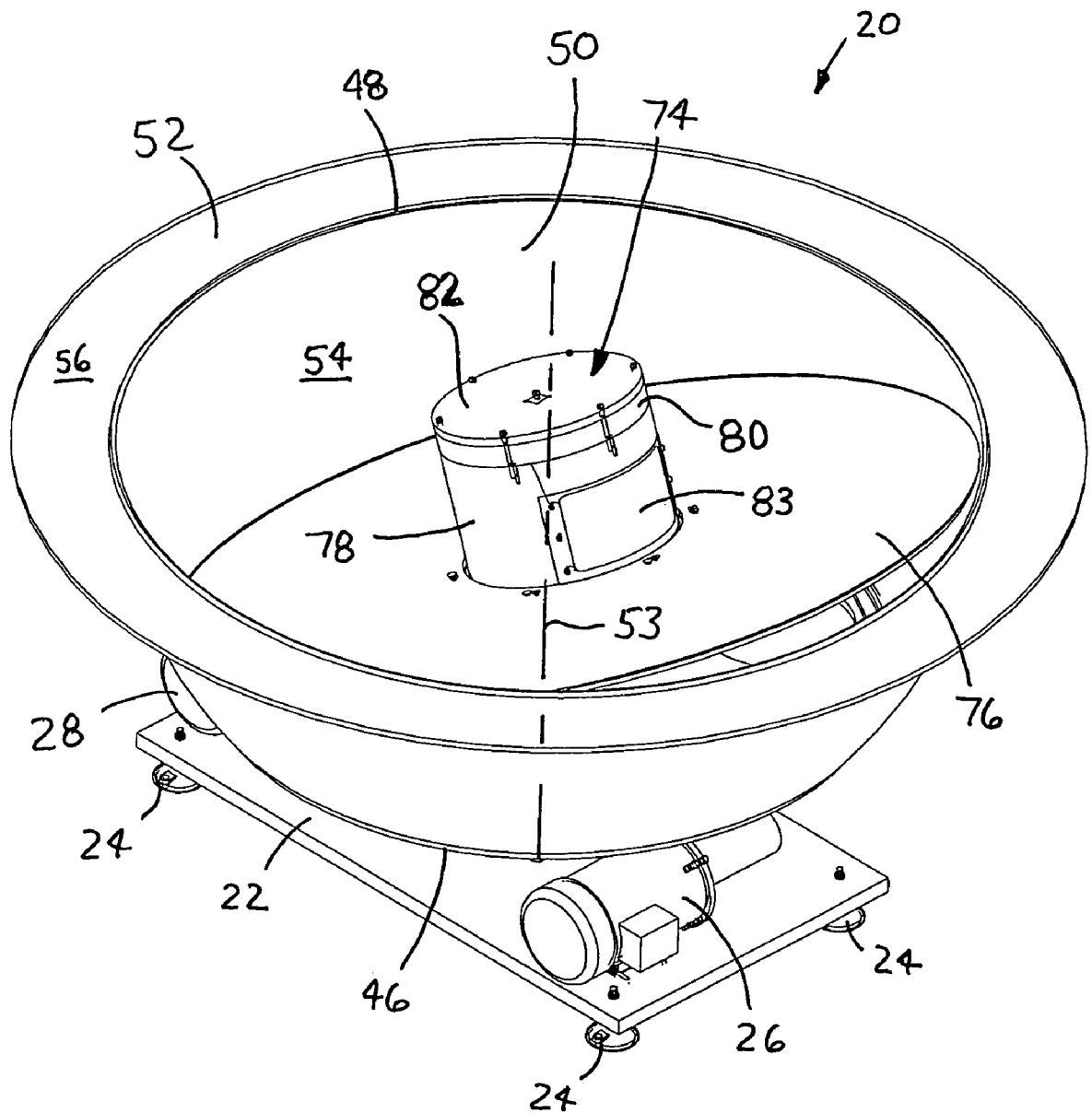
FIG. 1 is a perspective view of a rotary feeder in accordance with the present disclosure.
Figure 2:
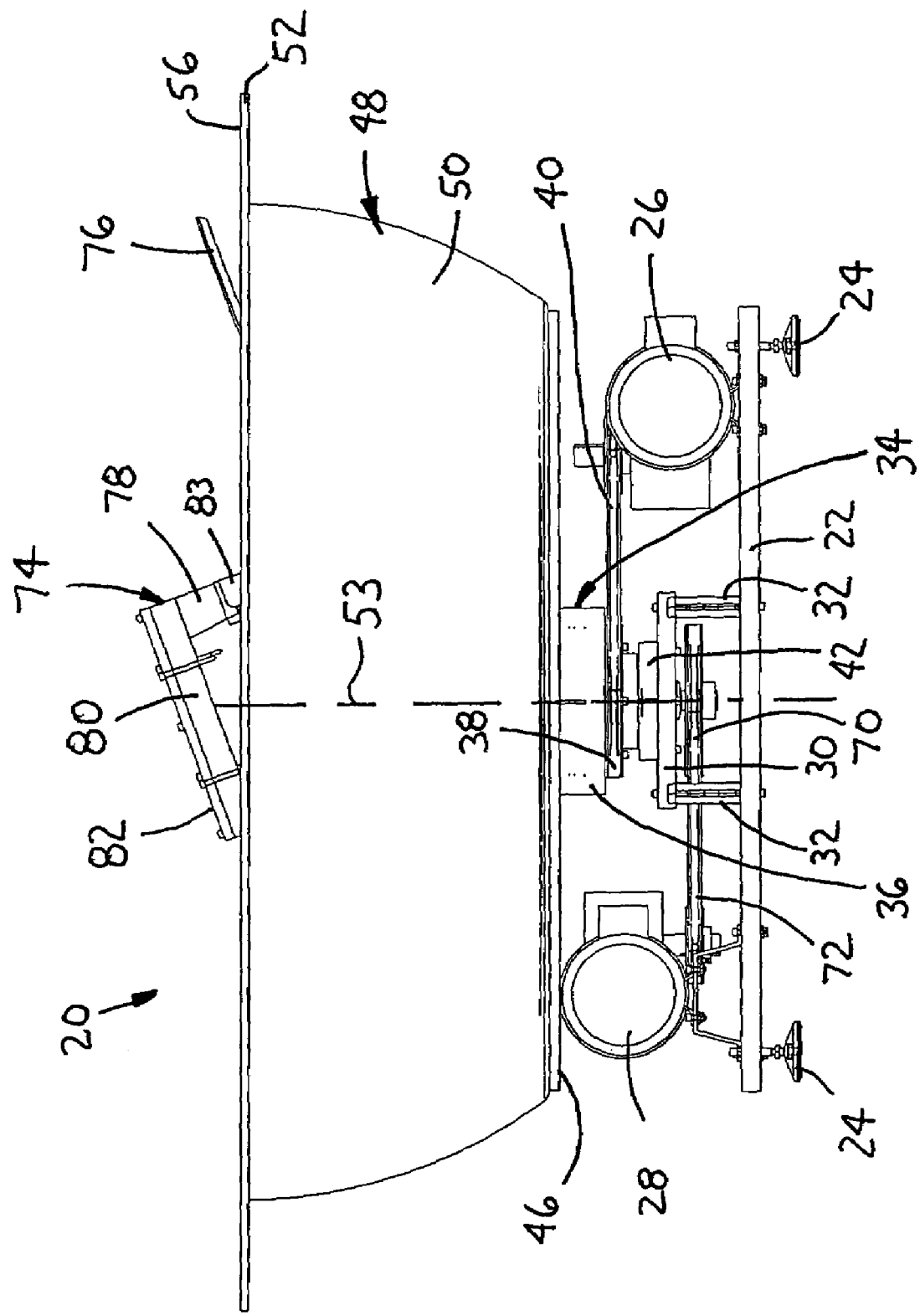
FIG. 2 is a side elevation view of the rotary figure of FIG. 1.
Figure 3:
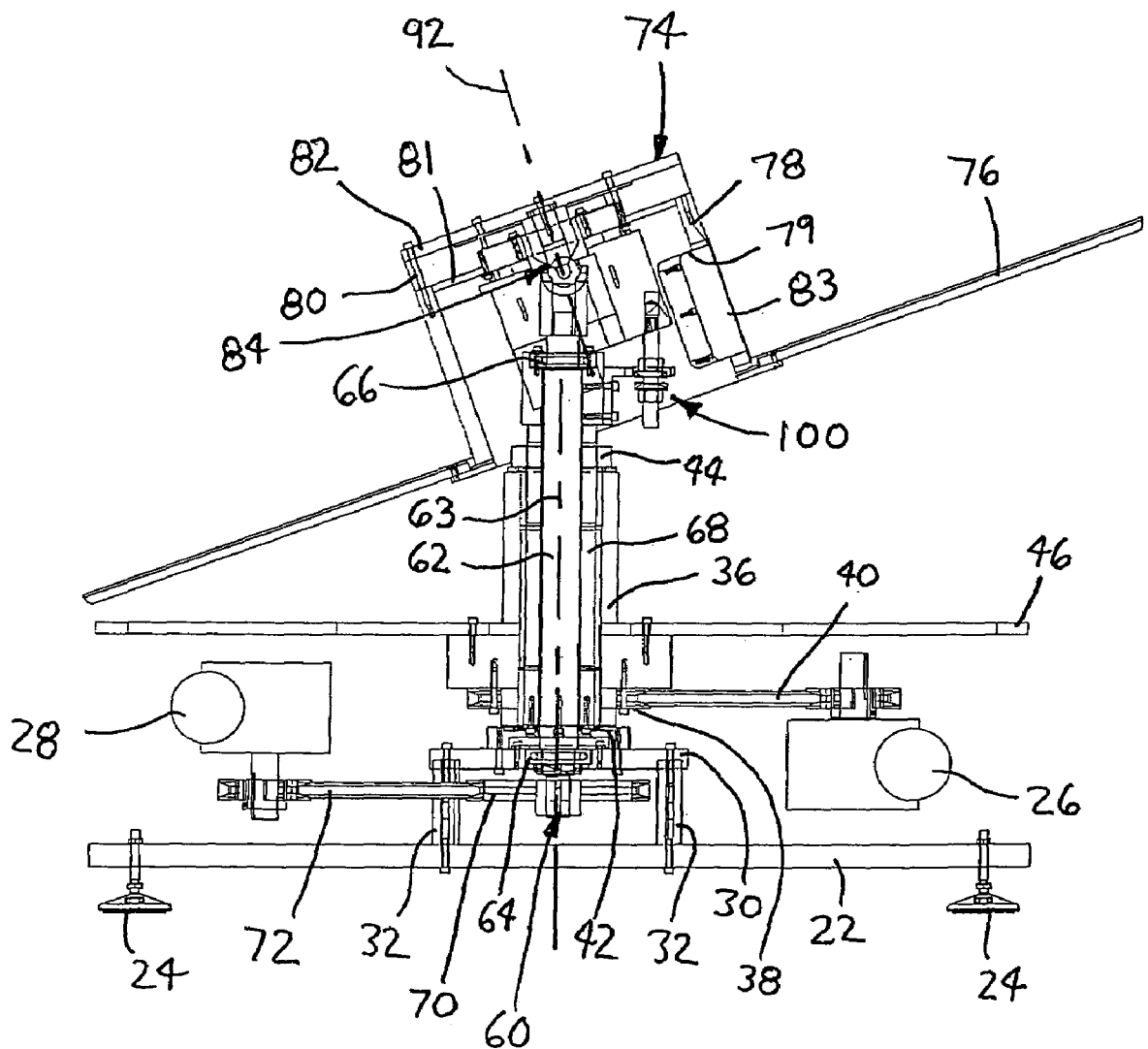
FIG. 3 is a side elevation view, in cross-section of the rotary feeder of FIG. 1 with the bowl removed for clarity.

Referring to FIGS. 1-3, the rotary feeder 20 includes a support frame 22 on which the various components of the feeder are mounted. In the illustrated embodiment, the support frame 22 is formed as a generally rectangular plate having four feet 24 extending downwardly therefrom to contact the floor or other support surface. First and second motors 26, 28 are mounted on the support frame 22. A platform 30 is positioned above the support frame 22 and is coupled to the support frame by columns 32.

The rotary feeder 20 includes a bowl assembly 34 that is operably coupled to the first motor 26. As best shown in FIG. 3, the bowl assembly 34 includes a lower hub 36 operably coupled to the first motor 26 by a pulley 38 and belt 40. A bearing 42 has a stationary outer race attached an upper surface of the platform 30 and a rotatable inner race coupled to a bottom end of the lower hub 36, thereby allowing the lower hub 36 to rotate with respect to the support frame 22. A second bearing 44 is also attached to a top end of the lower hub 36. A support plate 46 is attached to and rotates with the lower hub 36. A bowl 48, in turn, is coupled to the support plate 46. The bowl 48 includes a sidewall 50 and an out-turned flange 52. The sidewall 50 has an inner surface 54 that preferably has a semi-spherical shape. The out-turned flange 52 has an upper surface 56 that is preferably flat and substantially horizontally oriented. When assembled, the bowl 48 and support plate 46 define a reservoir for receiving individual articles, as will be better understood below. The bowl 48 rotates about a bowl axis 53, which may be substantially vertically oriented.

The bowl 48 is preferably formed of a polymer material to reduce the weight of the bowl and minimize noise during operation. In a currently preferred embodiment, the bowl 48 is cast from a hybrid, two-part synthetic urethane. In this embodiment, a two-piece mold may be used that forms a cavity there between. The two-part urethane is poured into the cavity and hardens over time. The mold is then separated and the bowl 48 is removed. By using a polymer material, the weight of the bowl 48 is reduced, thereby lowering the amount of power needed to rotate the bowl. In addition, noise generated by articles impacting the inner surface of the bowl is lower than that seen with typical metal bowls. The use of a resilient material, such as the urethane noted above, also cushions the impact of articles on the bowl, thereby reducing the chance of damage to the articles during processing.

A shaft 62 is also coupled to the support frame 22 as best shown in FIG. 3. The shaft 62 is mounted on and rotatable with respect to the platform 30. Specifically, a lower bearing 64 is positioned between a lower end of the shaft 62 and the platform 30, while an upper bearing 66 is disposed between an upper end of the shaft 62 and a riser 68. The shaft 62 is operably coupled to the second motor 28 by a pulley 70 and belt 72. In the illustrated embodiment, the shaft 62 has an axis 63 that is generally vertically oriented. The shaft axis 63 may be coincident with the bowl axis 53, as illustrated.

Figure 4:
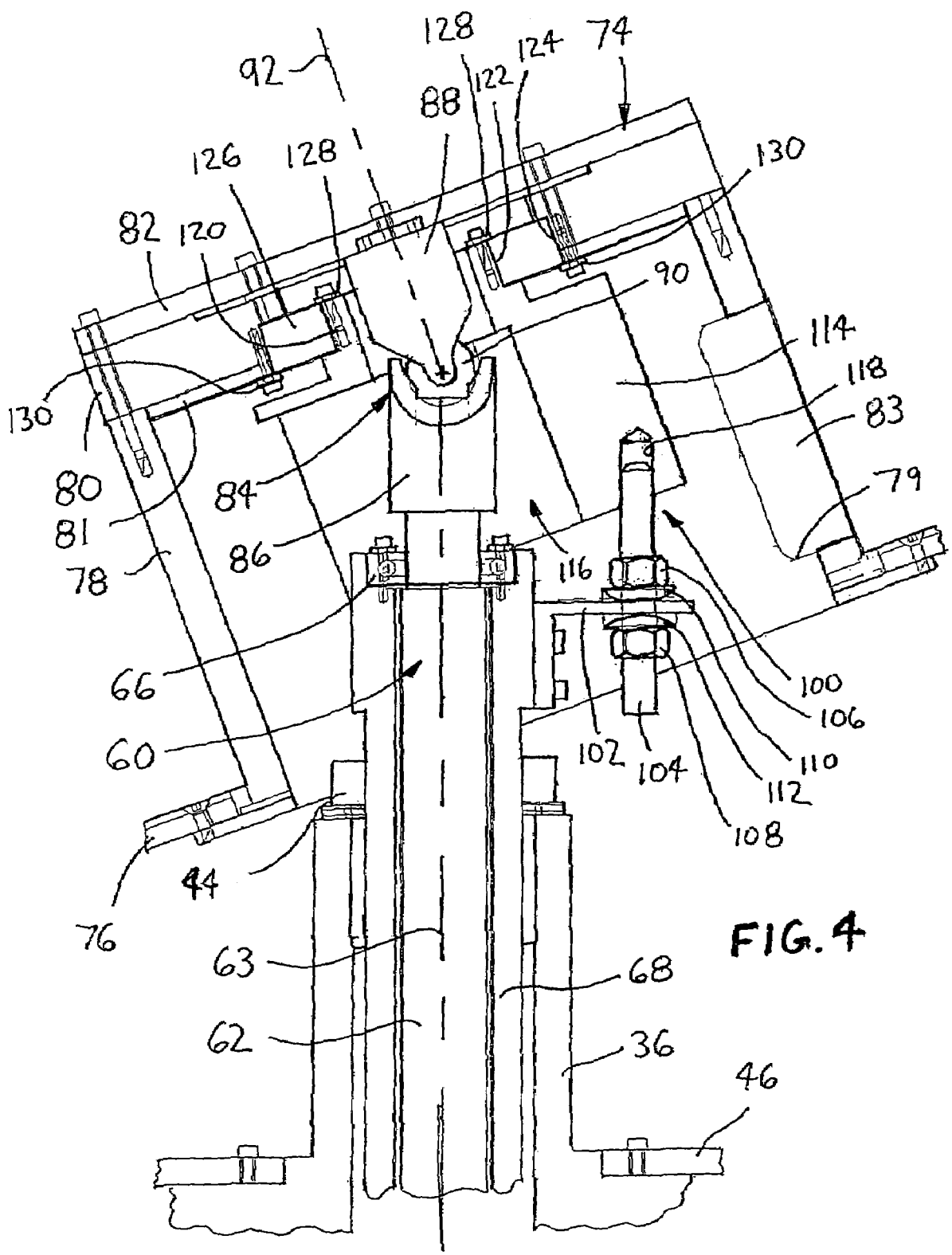
FIG. 4 is an enlarged side elevation view, in cross-section, of a detail of the rotary feeder illustrated in FIG. 1.

A disc assembly 74 is coupled to the shaft 62, as best illustrated in FIG. 4. The disc assembly 74 includes a disc 76, enclosure 78, top plate 80, spacer 81, and cap 82. The enclosure 78 includes an access opening 79 that may be closed off by a cover 83. The disc assembly 74 is connected to the shaft 62 by a pivotable coupling 84. In the illustrated embodiment, the coupling 84 is a universal joint having a first end 86 attached to the shaft 62, a second end 88 attached to the disc assembly 74, and a ball joint 90. The second end 88 is pivotable with respect to the first end 86 to be oriented along a tilt axis 92. The tilt axis 92 is oriented at an angle, and therefore is non-parallel, to the bowl axis 53. The disc 76 is oriented at an incline that is substantially perpendicular to the tilt axis 92. As such, the disc 76 has a lower portion positioned near a bottom of the bowl 48 and an upper portion positioned near the flange 52. The upper portion includes a transfer point where articles are passed from the disc 76 to the bowl flange 52.

The rotary feeder 20 also includes an adjustable guide assembly 100 for securing the disc assembly 74 and coupling second end 88 at a desired tilt axis 92. As best shown in FIG. 4, the adjustable guide assembly 100 includes a bracket 102 mounted to the support frame 22 via the riser 68 and platform 30. An adjustable pin, such as threaded rod 104, passes through an aperture in the bracket. First and second nuts 106, 108 may be threaded onto the threaded rod 104 above and below the bracket 102 to secure the threaded rod 104 at the desired elevation. To accommodate changes in the orientation of the threaded rod 104, the bracket aperture may be oversized and semi-spherical washers 110, 112 may be disposed between the associated nut 106, 108 and the bracket 102.

The adjustable guide assembly 100 further includes a hub 114 disposed between the shaft 62 and the disc assembly 74. The hub includes a cavity 116 sized to receive the shaft 62 and coupling first end 86 and is sufficiently large to allow the hub 114 to pivot with respect to the shaft 62. A threaded aperture 118 is formed in a lower phase of the hub 114 and is sized to receive the threaded rod 104. A collar 120 is formed at an upper end of the hub 114 and includes a cylindrical outer surface 122. The top plate. 80 and spacer 81 define a cylindrical inner surface spaced from the collar cylindrical outer surface 122. A bearing 126 is disposed between the outer and inner surfaces 122, 124 to allow the disc assembly 74 to rotate with respect to the hub 114. In the illustrated embodiment, the bearing 126 is retained in place by upper washers 128 fastened to the collar 120 and lower washers 130 fastened to the top plate 80.

The incline angle of the disc 76 may be adjusted by changing the elevation of the threaded rod 104. Adjusting the elevation of the threaded rod 104, which engages the threaded aperture 118 formed in the hub 114, causes the hub 114 to change the angle at which it is tilted. A change in the orientation of the hub 114 causes the disc assembly 74 to similarly change, and this change in orientation is accommodated by the pivotable coupling second end 88. Accordingly, the relative position of the disc transfer point defined by the disc upper portion with respect to the bowl flange 52 may be adjusted as desired simply by changing the elevation of the threaded rod 104. A desired orientation may be secured by tightening the nuts 106, 108 to hold the threaded rod 104 in place. This can be done without adjusting the orientation of the shaft 62.

In operation, the first and second motors 26, 28 rotate the bowl 48 and disc 76, respectively. The disc 76 is rotated at a speed such that at the transfer point, the static friction between the articles and the disc 76 is overcome by the centrifugal force acting on the articles, thereby causing the articles to move outward onto the flange 52. The bowl 48 is operated at a speed, typically greater than the disc speed, so that the parts are deposited on the flange 52 with desired spacing. As noted above, it may be desirable to raise or lower the disc upper portion so that the transfer point is above or below the flange 52. The adjustable guide assembly 100 allows the disc to be held at different incline angles without requiring a change in the orientation in the shaft 62.

Figure 5:
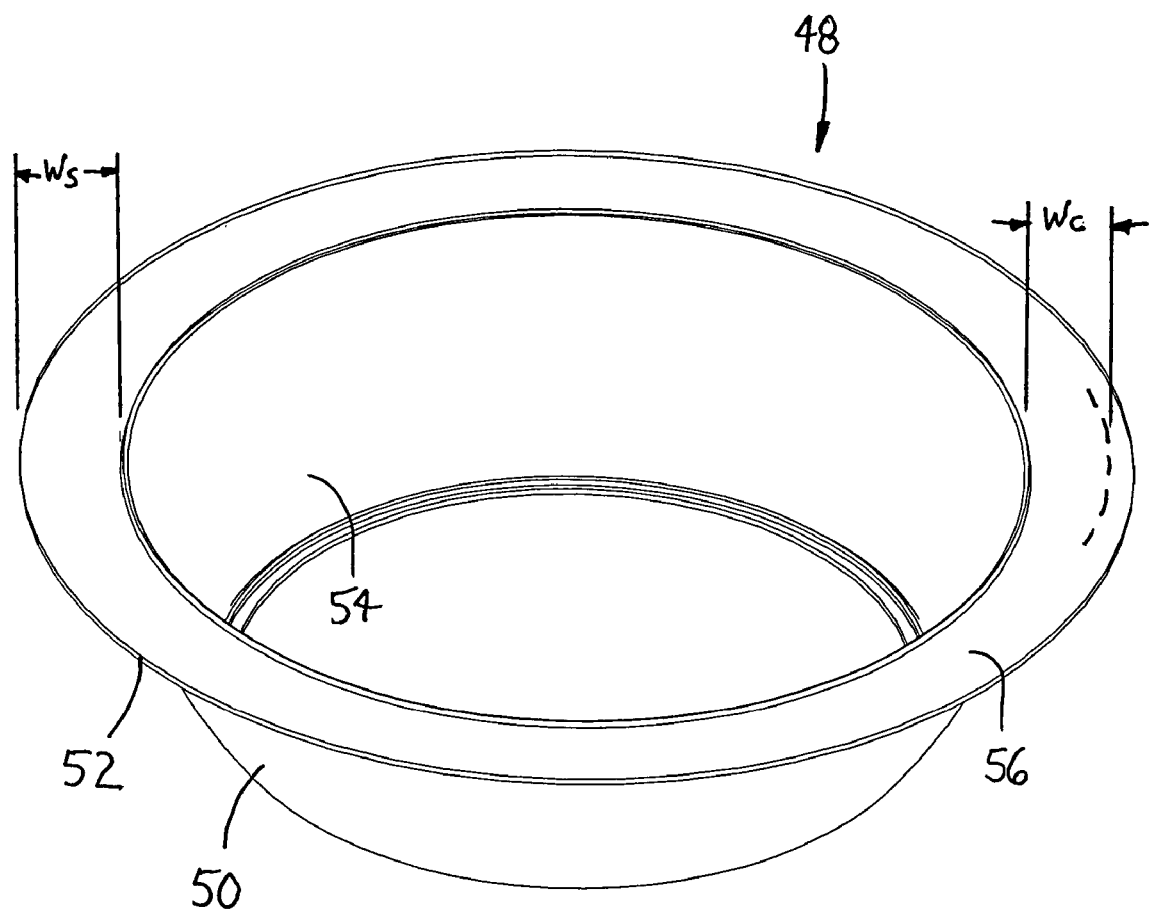
FIG. 5 is a perspective view of a bowl used in the rotary feeder of FIG. 1.

The present disclosure also contemplates a method of assembling rotary feeders that is less expensive and more precise. Specifically, it is noted that the width of the out-turned flange 52 is dependent on the size or orientation of the articles to be processed. Rather than fabricating the bowl 48 with the desired flange width, the bowl 48 may be formed with a standard, oversized flange width Ws that is later cut down to a custom width Wc (FIG. 5). As a result, multiple identical bowls 48 having oversized flanges may be formed, and each may then be modified to a custom flange width as needed. It is preferable to cut the flange to the desired flange width after the bowl has already been attached to the lower hub and support plate. By waiting until after the bowl is assembled in place, the flange may be cut to a precise, custom size that takes into account any tolerance or other issues that may form undesirable gaps between the flange and surrounding structure.

While the foregoing was written with reference to specific examples and embodiments, it is to be understood that the scope of the disclosure is not limited thereby. Instead, the detailed description is provided to satisfy best mode and enablement requirements while providing support for any and all claims which may issue here from.

What is claimed:

1. A rotary feeder for transferring articles, the rotary feeder comprising:
   a support frame;
   a rotatably driven bowl assembly mounted on the support frame and including a bowl mounted for rotation about a bowl axis;
   a rotatably driven shaft mounted on the support frame for rotation about a shaft axis;
   a coupling rotatably driven by the shaft, the coupling having a first end coupled to the shaft and a second end, the second end being pivotable with respect to the first end to define a tilt axis oriented at an angle with respect to the bowl axis;
   an adjustable guide assembly mounted on the support frame and adapted to adjust an angle of the coupling second end with respect to the bowl and secure the coupling second end along a selected tilt axis; and
   a disc coupled to the coupling second end and rotating about the tilt axis, the disc including a lower portion and an upper portion, the upper portion defining an article transfer point.

2. The rotary feeder of claim 1, in which the bowl includes a side wall and a flange, and in which the feed disc transfers articles to the flange.

3. The feeder of claim 2, in which the bowl side wall has a semi-spherical shape.

4. The feeder of claim 1, in which the coupling comprises a universal joint.

5. The feeder of claim 1, in which the bowl assembly includes a lower hub mounted on the support frame for rotation about the bowl axis, wherein the lower hub is concentric with the disc shaft.

6. The feeder of claim 1, in which the bowl assembly is operably coupled to a first drive and the disc shaft is operably coupled to a second drive.

7. The feeder of claim 1, further comprising a disc assembly coupled to the coupling second end, in which the disc is coupled to the disc assembly.

8. The feeder of claim 7, in which the adjustable guide assembly comprises a hub mounted on and pivotable with respect to the support frame, the hub supporting the disc assembly at a desired tilt axis.

9. The feeder of claim 8, in which the adjustable guide assembly includes a bracket coupled to the support frame and a support pin coupled to the bracket and having a support end adapted to engage the bracket.

10. The feeder of claim 9, in which the support pin is movable with respect to the bracket to adjust an orientation of the hub, thereby adjusting the tilt axis.

11. The feeder of claim 8, further including a bearing having a stationary inner race coupled to the hub and a rotatable outer race coupled to the disc assembly.

12. A rotary feeder for transferring articles, the rotary feeder comprising:
    a support frame;
    a rotatably driven lower hub mounted on the support frame;
    a bowl coupled to the lower hub assembly for rotation about a bowl axis, the bowl including a side wall and a flange;
    a rotatably driven shaft mounted on the support frame for rotation about a shaft axis, the shaft axis being substantially coincident with the bowl axis;
    a coupling rotatably driven by the shaft, the coupling having a first end coupled to the shaft and a second end, the second end being pivotable with respect to the first end to define a tilt axis oriented at an angle with respect to the bowl axis;
    a riser mounted on the support frame;
    an adjustable guide assembly coupled to the riser and adapted to adjust an angle of the coupling second end with respect to the bowl and to secure the coupling second end at a selected tilt axis; and
    a disc coupled to the coupling second end and rotating about the tilt axis, the disc including a lower portion and an upper portion, the upper portion defining an article transfer point for transferring articles from the disc to the bowl flange.

13. The feeder of claim 12, in which the bowl side wall has a semi-spherical shape.

14. The feeder of claim 12, in which the coupling comprises a universal joint.

15. The feeder of claim 12, in which the bowl assembly is operably coupled to a first drive and the disc shaft is operably coupled to a second drive.

16. The feeder of claim 12, further comprising a disc assembly coupled to the coupling second end, in which the disc is coupled to the disc assembly.

17. The feeder of claim 16, in which the adjustable guide assembly comprises a hub mounted on and pivotable with respect to the support frame, the hub supporting the disc assembly at a desired tilt axis.

18. The feeder of claim 17, in which the adjustable guide assembly includes a bracket coupled to the support frame and a support pin coupled to the bracket and having a support end adapted to engage the bracket.

19. The feeder of claim 18, in which the support pin is movable with respect to the bracket to adjust an orientation of the hub, thereby adjusting the tilt axis.

* * * * *